Sept. 2, 1969  P. LAURES  3,464,760

OPTICAL SYSTEM WITH VARIABLE FOCAL LENGTH

Filed March 6, 1968

3,464,760
OPTICAL SYSTEM WITH VARIABLE FOCAL LENGTH
Pierre Laures, Chatenay-Malabry, France, assignor to Compagnie Generale d'Electricte, a corporation of France
Filed Mar. 6, 1968, Ser. No. 710,880
Claims priority, application France, Mar. 6, 1967, 97,615
Int. Cl. G02b *15/00, 7/04*
U.S. Cl. 350—40          6 Claims

ABSTRACT OF THE DISCLOSURE

A system suitable for the exit of a laser comprising, disposed on the axis of the laser beam, a first afocal system of magnification $g$ and a second optical system formed by a first convergent lens of focal length $f_1$ and a convergent optical element of which the optical centre is positioned at the image focus of the first lens and of focal length $f_2$ close to $f_1$.

---

The present invention relates to an optical system particularly suitable for light beams emitted by a laser and more particularly for gas lasers.

The present invention is concerned with an optical system to be positioned at the exit from a laser and of which the focal length can be made easily variable, the exit element of the system receiving a constant illumination, whatever the value of the focal length.

The present invention has for its object an optical system suitable for the exit of a laser, characterized in that it comprises, disposed on a single optical axis coincident with the laser beam axis, a first afocal arrangement of magnification $g$ and a second optical system formed by a first convergent lens of focal length $f_1$ and a convergent optical element of which the optical centre is placed at the image focus of the first lens and of a focal length $f_2$ close to $f_1$, the diameter of the said convergent optical element of the said second optical system being at least equal to the diameter $2r$ of the beam on this element, the magnification $g$ of the afocal arrangement, the radius $r$ of the laser beam on the optical element of the convergent optical system, the focal length $f_1$ of the first lens, the wavelength $\lambda$ of the light, being connected by the relationship $$\pi r^2 g c = \lambda f_1^2$$

in which $c$ is the half-distance separating the Gaussian image points of the incident laser propagation, defined by $$c = \frac{\pi W_0^2}{\lambda}$$

where $W_0$ is the minimum radius of the laser beam.

According to a first embodiment, the convergent optical system is a convergent lens.

As a modification, the convergent optical system is a spherical or parabolic mirror.

The invention will be best understood from a detailed examination of a preferred embodiment of the invention, which is given by way of illustration and without any limiting character, as well as of the accompanying drawing in which.

Figure 1:
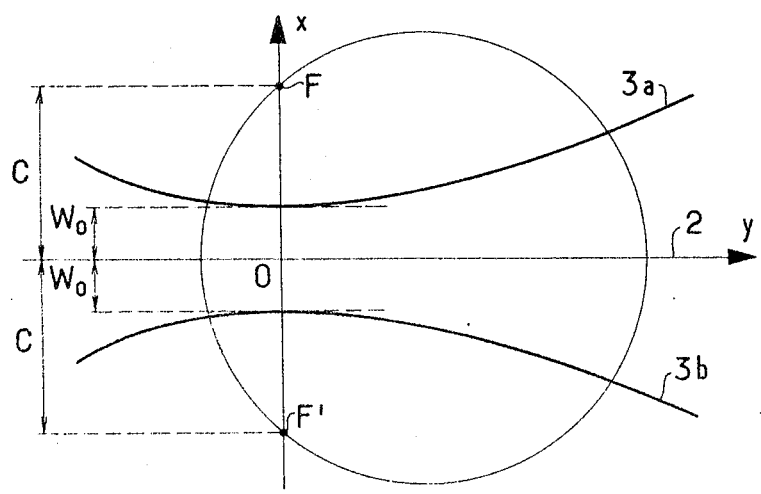
FIGURE 1 is a diagram representing the parameters of a Gaussian beam.

The characteristics of a Gaussian beam, such as a light beam emitted from a laser, are represented in FIGURE 1 in a diagram in rectangular coordinates $ox$ and $oy$. Such a beam has the form of a hyperboloid of axis $ox$ and has a plane equiphase surface, of which the amplitude at a coordinate point $x, y$ can be written:

$$E = E_0 \exp\left(-\frac{P^2}{W_0^2}\right)$$

in which $W_0$ is the minimum radius of the beam and $P^2 = x^2 + y^2$. The propagation is symmetrical about $oy$ and is completely determined by the knowledge of $W_0$. It is useful to introduce the points F and F', of ordinate $\pm c$, where $$c = \frac{\pi W_0^2}{\lambda}$$

F and F' are the focal points of the hyperbola representing the cross-section through the plane $xoy$ of the light beam, of which the branches are represented at $3a$ and $3b$.

Figure 2:
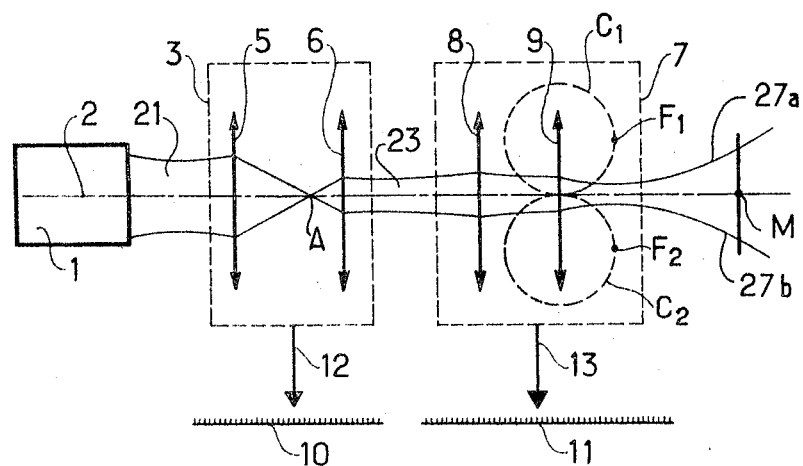
FIGURE 2 represents a diagram of the system assembly associated with a laser.

FIGURE 2 represents one embodiment of the optical system disposed at the exit of a laser 1 having the optical axis 2.

The optical assembly according to the invention comprises, in combination, two optical systems bearing the references 3 and 7.

The optical system 3 is formed by two convergent lenses 5 and 6, the image focus of the lens 5 being identical at A with the object focus of the lens 6. The system 3 is an afocal system of magnification $g$, advantageously very much smaller than 1. By way of example, the magnification $g$ of the afocal system 3 is of the order of one-tenth.

The optical system 7 is formed by two convergent lenses 8 and 9, of substantially equal focal lengths $f_1$ and $f_2$, the lens 9 being placed at the image focus of the lens 8.

The position of each of the two optical systems 3 and 7 is located relatively to that of the fixed laser 1 by any known means having graduations, for example, a micrometer screw; these means are illustrated in FIGURE 2 by two graduate scales 10 and 11, in front of which the indices 12 and 13 are respectively displaced.

The operation of the arrangement is as follows:

The beam 21 emitted by the laser 1 is transformed by the afocal system 3 into a beam 23; the afocal system 3 reduces the divergence of the incident beam 21 by the factor $g$, independently of the distance of the system 3 relatively to the laser.

The beam 23 is transformed into a divergent beam 27 by the system 7.

In the system 7, the second lens 9 receives from the lens 8 a beam of constant luminous intensity, whatever may be the distance from the system 7 to the laser, this intensity being distributed over an area of diameter $2r$.

According to one feature of the invention, the relationship:

$$\pi r^2 g c = \lambda f_1^2$$

exists between the focal length $f_1$ of the lens 8, the wavelength $\lambda$ of the light emitted by the laser, the magnification $g$ of the afocal system, the radius $r$ of the beam on the lens 9 and the half-distance $c$ separating the foci of the hyperbola characterising the beam emitted by the laser.

This relationship is matched, provided that the radius of the lens 9 is at least equal to the radius $r$ of the laser beam on this lens.

The Gaussian beam leaving the lens 9 is a hyperboloid of revolution, characterised in that the foci $F_2$ and $F_1$ of the hyperbola, with branches $27a$ and $27b$ (cross-section of th beam in a plane passing through the optical axis of the system) respectively have as their location, when the system 7 is displaced relatively to the laser, two circles $C_1$ and $C_2$ which are tangents to the optical axis of the optical centre of 9, situated on either side of the said axis and of like diameter equal to $\pi r^2/\lambda$.

Because of the arrangement according to the invention, it is possible, by simple displacement of the system 7, to obtain at a point M of the propagation axis of the beam:

(1) An area or spot of previously fixed dimension, (2) A wave front of determined curvature (possibly flat, if the point M is chosen on the straight line $F_2F_1$).

Similarly, by causing the position of the afocal system 3 to vary in relation to the laser while the system 7 remains fixed, it is possible to cause variation in the size of the luminous spot at the point M at the exit.

As a modification of the embodiment as illustrated, the lens 9 can be replaced by a concave parabolic or spherical mirror of like focal length $f_2$.

The aberrations of the system are corrected by the condition $f_2 \gg r$ (usual condition for a telescope).

The applications of the optical system according to the invention are numerous. For example, it is possible to provide a telescope which is autocollimating over a large distance. The propagation axis is then defined as the normal to a reflecting spherical surface positioned at a great distance. The system 7 is regulated so that the outward and return beams are coincident.

It is also possible to measure the distance between the system according to the invention and a given point in space, where a trihedral reflector is placed. The system 7 is regulated in such a way that the return spot is identical with that of the exit spot. The displacement of the system 7, measured on the scale 11 in relation to the laser, gives the value of the distance to be determined.

It is possible to effect the guiding of spacecraft by means of the arrangement according to the invention; the spacecraft is illuminated on a portion of its surface by the beam of constant dimensions emitted by the system, the dimensions of this beam being under the control of the possible displacement of the craft so that the same portion of the craft is illuminated. The craft comprises a network of photodetectors and the appropriate electronic systems enabling it to correct the vertical and horizontal displacements and the angular divergence, and to give an indication concerning the enlargement or the contraction of the luminous spot serving to correct the laser optical system.

I claim:

1. An optical system for a laser beam comprising a first afocal system of magnification $g$ for projecting a spot of predetermined dimensions and a second optical system for further projecting said spot and maintaining a constant luminous intensity thereof formed by a first convergent lens of focal length $f_1$ and a convergent optical element having the optical center thereof positioned at the image focus of the first lens and of focal length $f_2$ close to $f_1$, the diameter of the said convergent optical element of the said second optical system being at least equal to the diameter $2r$ of the beam on this element; said first and second systems being disposed on a single optical axis connecting with the optical axis of said laser beam with the magnification $g$ of the afocal system, the radius $r$ of the laser beam on the optical element of the convergent optical system, the focal length $f_1$ of the first lens and the wavelength $\lambda$ of the light being connected by the relationship $\pi r^2 gc = \lambda f^2$, in which $c$ is the half-distance separating the Gaussian image points of the incident laser propagation and defined by $$c = \frac{\pi W_0^2}{\lambda}$$

where $W_0$ is the minimum radius of the laser beam.

2. A system according to claim 1, wherein the first afocal system is movable in relation to the laser along the optical axis of the laser beam.

3. A system according to claim 1, wherein the second optical system is movable relatively to the laser along the optical axis of the laser beam.

4. A system according to claim 1, wherein the convergent optical element is a convergent lens.

5. A system according to claim 1, wherein the magnification of the first afocal system is considerable smaller than one.

6. A system according to claim 1, wherein the focal length of the convergent optical element is considerable greater than the radius of the laser beam on this element.

References Cited

UNITED STATES PATENTS

| | | |
|---|---|---|
| 2,454,686 | 11/1948 | Back. |
| 3,353,891 | 11/1967 | Rosenberger. |
| 3,419,321 | 12/1968 | Barber et al. |

DAVID SCHONBERG, Primary Examiner

PAUL R. GILLIAM, Assistant Examiner

U.S. Cl. X.R.

350—212, 44